United States Patent [19]

Burhans, Jr.

[11] Patent Number: 4,569,493
[45] Date of Patent: Feb. 11, 1986

[54] INTEGRATED MULTI-ROLE VARIABLE SWEEP WING AIRCRAFT

[75] Inventor: Walter R. Burhans, Jr., Miller Place, N.Y.

[73] Assignee: Grumman Aerospace Corporation, Bethpage, N.Y.

[21] Appl. No.: 475,198

[22] Filed: Mar. 14, 1983

[51] Int. Cl.$^4$ .............................................. B64C 13/16
[52] U.S. Cl. ................................... 244/76 R; 244/52; 244/45 A; 244/49; 244/12.4; 244/76. J
[58] Field of Search .................... 244/76 R, 76 J, 175, 244/45 A, 49, 46, 52, 12.1, 12.4

[56] References Cited

U.S. PATENT DOCUMENTS

| | | | |
|---|---|---|---|
| 2,822,995 | 2/1958 | Bowen | 244/49 |
| 3,064,928 | 11/1962 | Toll | 244/46 |
| 3,489,375 | 1/1970 | Tracy | 244/49 |
| 3,680,816 | 8/1972 | Mello | 244/46 |
| 3,881,671 | 5/1975 | Bouchnik | 244/140 |
| 3,884,435 | 5/1975 | Croy et al. | 244/76 J |
| 3,926,389 | 12/1975 | Mederer | 244/76 R |
| 4,116,405 | 9/1978 | Bacchi et al. | 244/12.4 |

Primary Examiner—Trygve M. Blix
Assistant Examiner—Rodney Corl
Attorney, Agent, or Firm—Richard G. Geib; Daniel J. Tick; Bernard S. Hoffman

[57] ABSTRACT

Canards are pivotally mounted on the fuselage of a variable sweep wing jet aircraft and project laterally with respect to the fuselage forwardly of the wings. The canards are positioned and configured to produce pitch control moments about the center of gravity. Thrust-vectoring devices extend from the jet engines of the aircraft for varying the thrust direction of such engines. A control system is mounted in the fuselage and extends to the wings, the canards and the thrust-vectoring devices for controlling the wings in angular positions relative to the fuselage, controlling the canards in rotary position relative to the fuselage and controlling the thrust-vectoring devices to control the thrust direction. The positions are controlled in coordination to overcome pitch departure, deep stall and spin, which might otherwise occur due to lack of nose-down pitch power, while also optimizing supersonic cruise and transonic maneuver performance of the aircraft.

6 Claims, 7 Drawing Figures

INTEGRATED MULTI-ROLE VARIABLE SWEEP WING AIRCRAFT

BACKGROUND OF THE INVENTION

The present invention relates to an aircraft. More particularly, the invention relates to an integrated multi-role variable sweep wing aircraft.

The subsonic static instability level is selected to maximize supersonic cruise and transonic maneuver performance. Current research, including piloted simulations, however, indicate that in the subsonic Air Combat Maneuvering, or ACM, environment, aircraft with these levels of static instability are prone to pitch departure, deep stall and spin, which might otherwise occur due to lack of nose-down pitch power.

The principal object of the invention is to provide an aircraft which overcomes the tendency to pitch departure, deep stall and spin, and permits the maximum maneuvering potential of the aircraft to be realized.

An object of the invention is to provide a variable sweep wing aircraft which overcomes forces tending to pitch the nose up when the wings sweep forward.

Another object of the invention is to provide an aircraft having optimized supersonic cruise and transonic maneuver performance.

Still another object of the invention is to provide an aircraft which has good high lift, low speed control and performance.

BRIEF SUMMARY OF THE INVENTION

In accordance with the invention, an aircraft has a fuselage with a nose, jet engines and wings mounted on and projecting from the fuselage for supplying lift to the aircraft. The wings are pivotally mounted on he fuselage for swinging movement between a forwardly disposed position, wherein the included angle between the wings and the fuselage is relatively large, and rearwardly disposed aft sweep positions wherein the included angle between the wings and the fuselage is smaller, the resultant of the lifting forces exerted by the wings being to the rear of the center of gravity for the aircraft irrespective of the position of the wings and being located further rearwardly in the aft sweep position than in the forward position, whereby the lift forces on the wings create a nose-down moment about the center of gravity. The aircraft comprises canards pivotally mounted on the fuselage and projecting laterally with respect to the fuselage forwardly of the wings and center of gravity and spaced longitudinally from the wings. The canards are positioned and configured to produce a moment about the center of gravity which is in opposition to the nose-down moment created by the wings. Thrust-vectoring devices extend from the jet engines for varying the thrust direction of the jet engines and provide moment control. A control system is mounted in the fuselage and extends to the wings, the canards and the thrust-vectoring devices for controlling the wings in angular positions relative to the fuselage, controlling the canards in rotary position relative to the fuselage and controlling the thrust-vectoring devices to control the thrust direction. The positions are controlled in coordination to provide maximized subsonic takeoff and landing, transonic maneuver and supersonic cruise performance of the aircraft, while keeping the aircraft safe from pitch departure, deep stall and spin.

The canards are rotatable about a control axis extending substantially perpendicularly to the fuselage.

The thrust-vectoring devices comprise exhaust nozzles extending aft of the jet engines. The nozzles have nozzle flaps affixed to and extending rearwardly therefrom and variable in position in a plane substantially perpendicular to that of the wings.

The nozzle flaps are rotatable about nozzle axes extending substantially parallel to the control axis.

The control system rotates the nozzle flaps to an angle sufficient to provide a moment about the center of gravity to pitch the nose of the aircraft down when the wings are swept forward to obtain additional lift and slower landing speed and thereby create forces tending to pitch the nose up.

The control system also rotates the canards leading edge up to provide a nose-up pitching moment to balance out negative pitching moments due to thrust-vectored lift enhancement on landing approach.

In accordance with the invention, an aircraft has a fuselage with a nose, jet engines and wings mounted on and projecting from the fuselage for supplying lift to the aircraft. The wings are pivotally mounted on the fuselage for swinging movement between a forwardly disposed position, wherein the included angle between the wings and the fuselage is relatively large, and rearwardly disposed aft sweep positions wherein the included angle between the wings and the fuselage is smaller, the resultant of the lifting forces exerted by the wings being to the rear of the center of gravity for the aircraft irrespective of the position of the wings and being located further rearwardly in the aft sweep position than in the forward position, whereby the lift forces on the wings create a nose-down moment about the center of gravity. The aircraft comprises horizontal stabilizers mounted on the fuselage behind the wings and spaced longitudinally from the wings. The horizontal stabilizers are positioned and configured to produce a moment about the center of gravity which opposes the nose-down moment exerted by the wings. Thrust-vectoring devices extend from the jet engines for varying the thrust direction of the jet engines. A control system is mounted in the fuselage and extends to the wings, the horizontal stabilizers and the thrust-vectoring devices for controlling the wings in angular position relative to the fuselage, controlling the horizontal stabilizers in rotary position relative to the fuselage and controlling the thrust-vectoring devices to control the thrust direction. The positions are controlled in coordination to overcome pitch departure, deep stall and spin, which could otherwise occur due to lack of nose-down pitch power thereby providing maximum supersonic cruise and transonic maneuver performance of the aircraft.

The horizontal stabilizers have flaps rotatable about a stabilizer axis extending substantially perpendicularly to the fuselage.

The thrust-vectoring devices comprise exhaust nozzles extending aft of the jet engines. The nozzles have nozzle flaps affixed to and extending rearwardly therefrom and variable in position in a plane substantially perpendicular to that of the wings.

The nozzle flaps are rotatable about nozzle axes extending substantially parallel to the stabilizer axis.

The control system rotates the nozzle flaps to an angle sufficient to provide a moment about the center of gravity to pitch the nose of the aircraft down when the wings are swept forward to obtain additional lift and slower landing speed and thereby create forces tending to pitch the nose up.

The control system rotates the horizontal stabilizer flaps leading edge down to provide a nose-up pitching moment to balance out negative pitching moments due to thrust-vectored lift enhancement on landing approach.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
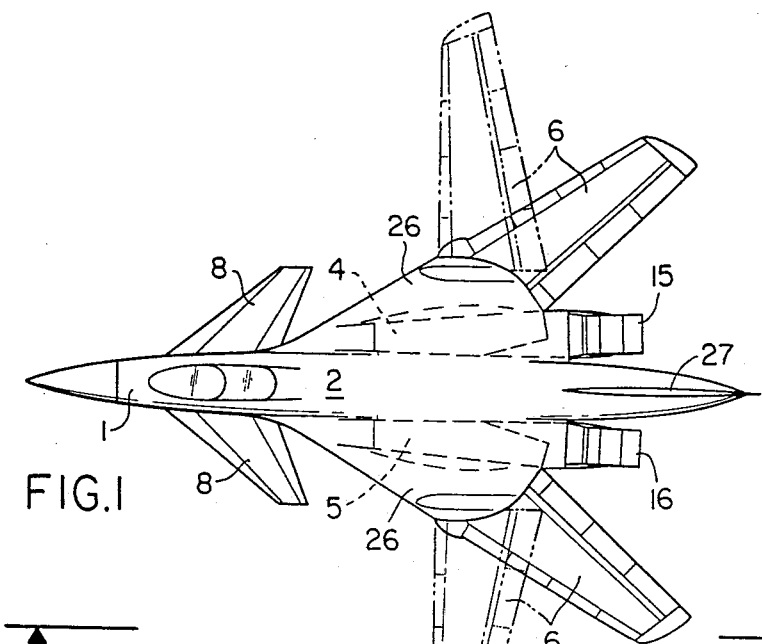
FIG. 1 is a top plan view of a first embodiment of the aircraft of the invention.
Figure 2:
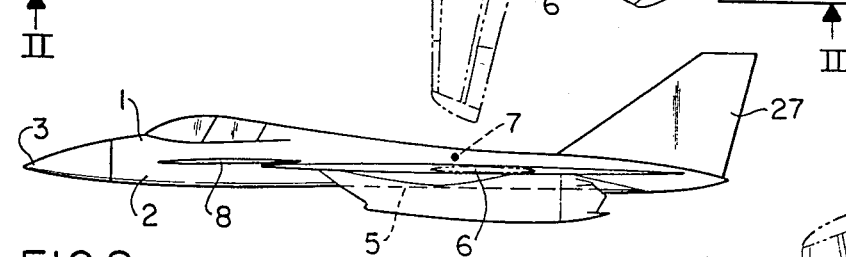
FIG. 2 is a side view, taken along the lines II—II, of the embodiment of FIG. 1.
Figure 3:
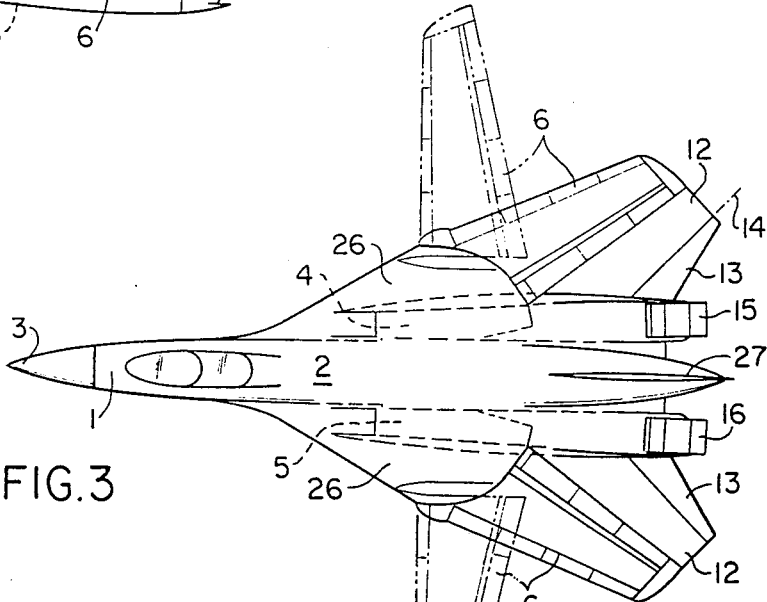
FIG. 3 is a top plan view of a second embodiment of the aircraft of the invention.

An aircraft 1 (FIGS. 1 to 4) has a fuselage 2 with a nose 3 and jet engines 4 and 5, as shown in FIGS. 1 to 4. Wings 6 are mounted on, and project from, the fuselage 2 and function to supply lift to the aircraft 1 in the usual manner. As shown in FIGS. 1 and 3, the wings 6 are pivotally mounted on the fuselage 2 for swinging movement between a forwardly disposed position, shown in broken lines in FIGS. 1 and 3, wherein the included angle between said wings and said fuselage is relatively large, and rearwardly disposed aft sweep positions, shown by solid lines in FIGS. 1 and 3, wherein the included angle between said wings and said fuselage is smaller. The resultant of the lifting forces exerted by the wings 6 is to the rear of the center of gravity 7 (FIGS. 2 and 4) for the aircraft 1 irrespective of the position of said wings and is located further rearwardly in the aft sweep position than in the forward position, whereby the lift forces on said wings create a nose-down moment about said center of gravity.

Figure 5:
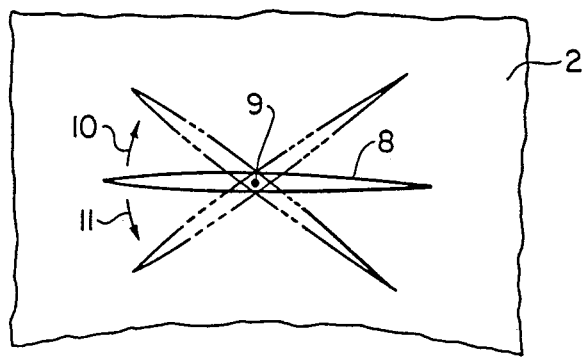
FIG. 5 is a schematic diagram, on an enlarged scale, an embodiment of the canards of the embodiment of FIGS. 1 and 2.

In accordance with the invention, canards 8 (FIGS. 1, 2 and 5) are pivotally mounted on the fuselage 2 and project laterally with respect to said fuselage forwardly of wings 6 and said center of gravity 7 (FIGS. 1 and 2) and are spaced longitudinally from said wings. The canards 8 are positioned and configured to produce a moment about the center of gravity 7 which is in opposition to the nose-down moment created by the wings 6. As shown in FIG. 5, the canards 8 are rotatable about a control axis 9 extending substantially perpendicularly to the fuselage 2. As shown in FIG. 5, the canards 8 are movable leading edge up in the direction of arrow 10, and leading edge down in the direction of arrow 11. When the canards 8 are rotated leading edge up, they provide a nose-up pitch or moment of the aircraft 1 and when said canards are rotated leading edge down, they produce a nose-down pitch or moment of said aircraft.

Figure 4:
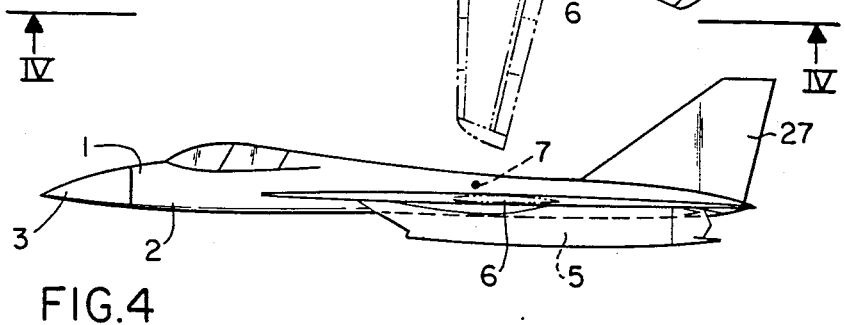
FIG. 4 is a side view, taken along the lines IV—IV of the embodiment of FIG. 3.

The embodiment of FIGS. 3 and 4 differs from that of FIGS. 1 and 2 in that the canards 8 are replaced in the embodiment of FIGS. 3 and 4 by horizontal stabilizers 12, and shown in FIGS. 3 and 4. The horizontal stabilizers 12 are mounted on the fuselage 2 behind the wings 6 and are spaced longitudinally from said wings (FIGS. 3 and 4). The horizontal stabilizers 12 are positioned and configured to have the same effect as the canards 8 which they replace, except that the directions of rotation are reversed. The horizontal stabilizers 12 thus produce a pitch or moment about the center of gravity 7 which opposes the nose-down moment exerted by the wings 6. The horizontal stabilizers 12 are of known structure and operation and, in the usual manner, have flaps 13 (FIGS. 3 and 4) rotatable about a stabilizer axis 14 (FIG. 3) extending substantially perpendicularly to the fuselage 2.

Figure 6:
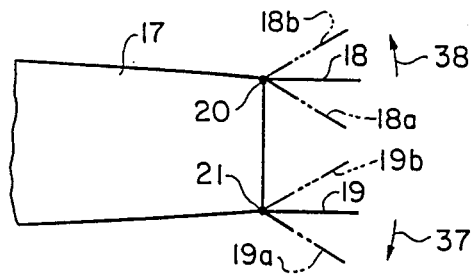
FIG. 6 is schematic diagrams, on an enlarged scale, of an embodiment of the thrust-vectoring device of the aircraft of the invention.

In accordance with the invention, thrust-vectoring devices 15 and 16 extend from the jet engines 4 and 5 for varying the thrust direction of said engines (FIGS. 1 and 3). The thrust-vectoring devices 15 and 16 comprise exhaust nozzles extending aft of the jet engines 4 and 5, respectively. Since the thrust-vectoring devices 15 and 16 are essentially identical, they are described with reference to FIG. 6. Thus, as shown in FIG. 6, the nozzle 17 of the thrust-vectoring device 16 has a pair of nozzle flaps 18 and 19 affixed to, and extending rearwardly therefrom, and variable in position in a plane substantially perpendicular to that of the wings 6. Such perpendicular plane is that of the sheet of illustration. Thus, the nozzle flaps 18 and 19 are rotatable about nozzle axes 20 and 21, respectively, extending substantially parallel to the control axis 9, in the embodiment of FIGS. 1 and 2, and substantially parallel to the stabilizer axis 14, in the embodiment of FIGS. 3 and 4.

The aircraft 1 has wing mounts 26, in the usual manner of sweep wing aircraft, and a vertical stabilizer 27, in the usual manner of aircraft, as shown in FIGS. 1 to 4.

Figure 7:
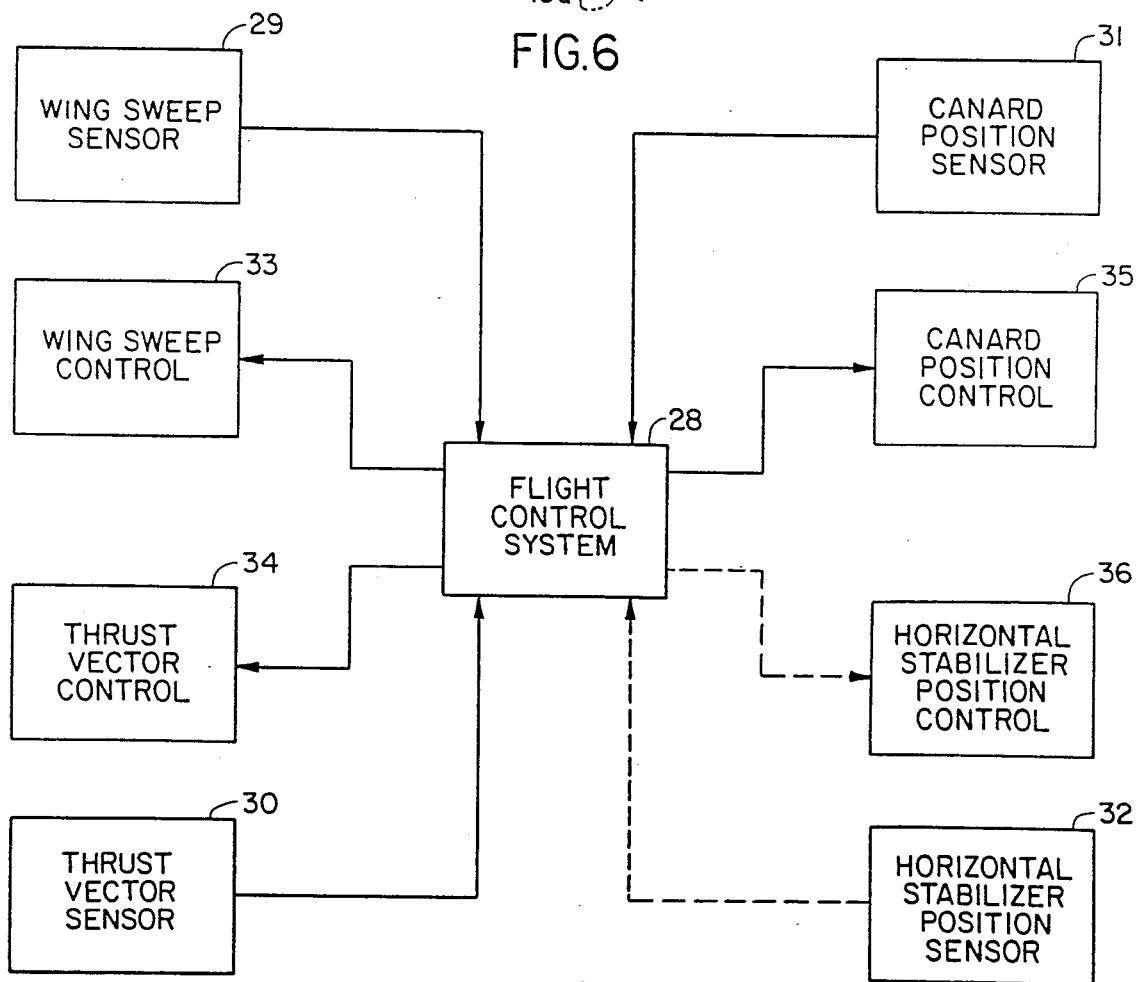
FIG. 7 is a block diagram of an embodiment of the control system of the invention.

Further in accordance with the invention, a control system, shown in FIG. 7, is mounted in the fuselage 1 and extends to, and is coupled with, the wings 6, the canards 8 in the embodiment of FIGS. 1 and 2, the horizontal stabilizers 12 in the embodiment of FIGS. 3 and 4, and the thrust-vector devices 15 and 16. The control system functions to control the wings 6 in angular positions relative to the fuselage 2, to control the canards 8 in rotary position relative to said fuselage in the embodiment of FIGS. 1 and 2, to control the horizontal stabilizers 12, and more particularly, the flaps 13 thereof, in rotary position relative to the fuselage in the embodiment of FIGS. 3 and 4, and to control the thrust-vectoring devices 15 and 16 to control the thrust direction. The control system is based on an advanced digital fly-by-wire flight control system 28 of any suitable known type.

As shown in FIG. 7, a wing sweep sensor 29 of any suitable known type detects the position of the wings 6 relative to the fuselage 2 and conveys such information to the flight control system 28. A thrust-vector sensor 30 detects the positions of the flaps 18 and 19 of the thrust-vectoring devices 15 and 16 and feeds such information to the flight control system 28. A canard position sensor 31 of any suitable known type detects the position of the canards 8 relative to the plane of the wings 6 and conveys such information to the flight control system 28, in the embodiment of FIGS. 1 and 2. A horizontal stabilizer position sensor 32 of any known type detects the position of the flaps 13 of the horizontal stabilizer 12 relative to the plane of the wings 6 and conveys such information to the flight control system 28, in the embodiment of FIGS. 3 and 4.

The flight control system 28 is programmed to eliminate pitch departure, deep stall and spin, which could otherwise occur due to the lack of nose-down pitch power, so that the maximum maneuvering potential of the aircraft 1 may be realized. The flight control system 28 thus processes the data fed to it from the wing sweep sensor 29, the thrust-vector sensor 30 and the canard position sensor 31 or horizontal stabilizer position sensor 32 and controls a wing sweep control 33 of any suitable known type, a thrust-vector control 34 of any suitable known type and a canard position control 35 of any suitable known type or a horizontal stabilizer position control 36 of any suitable known type, accordingly, to eliminate the aforementioned adverse effects of a lack of nose-down pitch power.

A feature of the aircraft of the invention is that unsweeping past a predetermined reference sweep results in additional instability. The reference sweep may be 20°, for example. This is advantageous in the embodiment of FIGS. 1 and 2 of the invention, since its associated nose-up pitching moment may be used to balance out the negative pitching moments associated with thrust-vectored lift enhancement on approach.

The control system of FIG. 7 functions to rotate the nozzle flaps 18 and 19 to an angle sufficient to provide a moment about the center of gravity 7 of the aircraft 1 to pitch the nose 3 of said aircraft down when the wings 6 are swept forward to obtain additional lift and slower landing speed and thereby create forces tending to pitch said nose up. In this case, the nozzle flaps 18 and 19 are moved downward, in the direction of and arrow 37, to their broken line positions 18a and 19a, shown in FIG. 6. When the nozzle flaps 18 and 19 are moved upward, in the direction of an arrow 38, to their broken line positions 18b and 19b, shown in FIG. 6, they provide a nose-up pitching moment.

The control system of FIG. 7 also rotates the canards 8 in the direction of the arrow 10 of FIG. 5, in the embodiment of FIGS. 1 and 2, and rotates the horizontal stabilizer flaps 13 trailing edge down, in the embodiment of FIGS. 3 and 4, to provide a nose-up pitching moment to balance out negative pitching moments due to thrust-vectored lift enhancement on landing approach.

The variable sweep wing 6 may move from a slightly forward sweep position, shown by broken lines in FIGS. 1 and 3, to a position to provide a delta wing plan form for the aircraft, shown by solid lines in FIGS. 1 and 3. The canards 8 handle the instability shift from the straight to delta wing form, as do the horizontal stabilizer 12. The wings 6 are swept forward to obtain additional lift and slower landing speeds. As herein explained, in order to overcome forces tending to pitch the nose 3 up by reason of forward sweeping of the wings 6, the thrust-vectoring devices 15 and 16 are operated by the control system as said wings move forward to provide a moment about the center of gravity 7 to pitch said nose down.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. An aircraft having a fuselage with a nose, jet engine means and wings mounted on and projecting from said fuselage for supplying lift to said aircraft, said wings being pivotally mounted on said fuselage for swinging movement between a forwardly disposed position, wherein the included angle between said wings and said fuselage is relatively large, and rearwardly disposed aft sweep positions wherein the includes angle between said wings and said fuselage is smaller, the resultant of the lifting forces exerted by said wings being to the rear of the center of gravity for said aircraft irrespective of the position of said wings and being located further rearwardly in the aft sweep position than in the forward position, whereby the lift forces on said wings create a nose-down moment about said center of gravity, said aircraft comprising canards pivotally mounted on said fuselage and rotatable about a control axis extending substantially perpendicularly to said fuselage, said canards projecting laterally with respect to said fuselage sorwardly of said wings and center of gravity and being spaced longitudinally from said wings, said canards being positioned and configured to produce a moment about said center of gravity which is in opposition to the nose-down moment created by said wings;

thrust-vectoring means extending from said jet engine means for varying the thrust direction of said jet engine means and providing momeent control, said thrust-vectoring means having an exhaust area and flaps affixed to and extending rearwardly therefrom, said flaps being variable in position in a plane substantially perpendicular to that of said wings;

wing sweep sensing means for detecting the position of said wings relative to said fuselage and providing corresponding information;

thrust-vector sensing means for detecting the position of the flaps of said thrust-vectoring means and prodiving corresponding information;

canard position sensing means for detecting the position of said canards relative to the plane of said wings and providing corresponding information; and control means mounted in said fuselage and extending to said wings, said canards and said thrust-vectoring means and to said wing sweep sensing means, said thrust-vector sensing means and said canard position sensing means for controlling said wings in angular positions relative to said fuselage, controlling said canards in rotary position relative to said fuselage and controlling said thrust-vectoring means to control said thrust direction in accordance with information received from said sensing means, said control means rotating the leading edges of said canards up to provide a nose-up pitching moment to balance out negative pitching moments due to thrust-vectored lift enhancement on landing approach and controlling said positions in coordination to provide maximized subsonic takeoff and landing, transonic maneuver and supersonic cruise performance of said aircraft while keeping said aircraft safe from pitch departure, deep stall and spin.

2. An aircraft as claimed in claim 1, wherein said thrust-vectoring means comprises exhaust nozzle means extending aft of said jet engine means and said flaps consits of nozzle flaps affixed to and extending rearwardly from said nozzle means and variable in position in a plane substantially perpendicular to that of said wings, said nozzle flaps being rotatable nozzle axes extending substantially parallel to said control axis.

3. An aircraft as claimed in claim 2 wherein said control means rotates said nozzle flaps to an angle sufficient to provide a moment about said center of gravity to pitch the nose of said aircraft down when said wings are swept forward to obtain additional lift and slower landing speed and thereby create forces tending to pitch said nose up.

4. An aircraft having a fuselage with a nose, jet engine means and wings mounted on and projecting from said fuselage for supplying lift said aircraft, and wings being pivotally mounted on said fuselage for swinging movement between a forwardly disposed position, wherein the included angle between said wings and fuselage is relatively large, and rearwardly disposed aft sweep positions wherein the included angle between said wings and said fuselage is smaller, the resultant of the lifting forces exerted by said wings being to the rear of the center of gravity for said aircraft irrespective of the position of said wings and being located further rearwardly in the aft sweep position than in the forward position, whereby the lift forces on said wings create a nose-down moment about said center of gravity, said aircraft comprising horizontal stabilizers mounted on said fuselage behine said wings and being spaced longitudinally from said wings, said horizontal stabilizers being positioned and configured to produce a movement about said center of gravity which oppose the nose-down moment exerted by said wings, said horizontal stabilizers having flaps rotatable about a stabilizer axis extending substantially perpendicularly to said fuselage;

thrust-vectoring means extending from said jet engine means for varying the thrust direction of said jet engine means, said thrust-vectoring means comprising exhaust nozzle means extending aft of said jet engine means, said nozzle means having nozzle flaps affixed to and extending rearwardly therefrom and variable in position in a plane substantially perpendicular to that of said wings;

wing sweep sensing means for detecting the position of said wings relative to said fuselage and providing corresponding information;

thrust-vector sensing means for detecting the positions of said nozzle flaps and providing corresponding information;

horizontal stabilizer position sensing means for detecting the position of said flaps of said horizontal stabilizer relative to the plane of said wings and providing corresponding information; and control means mounted in said fuselage and extending to said wings, said horizontal stabilizers and said thrust-vectoring means and to said wing sweep sensing means, said thrust-vector sensing means and said horizontal stabilizer position sensing means for controlling said wings in angular position relative to said fuselage, controlling said flaps of said horizontal stabilizers in rotary position relative to said fuselage and controlling said thrust-vectoring means to control said thrust direction in accordance with information received from said sensing means, said control means rotating said nozzle flaps to an angle sufficient to provide a moment about said center of gravity to pitch the nose of said aircraft down when said wings are swept forward to obtain additional lift and slower landing speed and thereby create forces tending to pitch said nose-up and controlling said positions in coordination to overcome pitch departure, deep stall and spin, due to lack of nose-down pitch power thereby providing maximum supersonic cruise and transonic maneuver performance of said aircraft.

5. An aircraft as claimed in claim 4, wherein said nozzle flaps are rotatable about nozzle axes extending substantially parallel to said stabilizer axis.

6. An aircraft as claimed in claim 4, wherein said control means rotates said horizontal stabilizer flaps trailing edge up to provide a nose-up pitching moment to balance out negative pitching moments due to thrust-vectored lift enhancement on landing approach.

* * * * *

UNITED STATES PATENT AND TRADEMARK OFFICE
CERTIFICATE OF CORRECTION

PATENT NO. : 4,569,493
DATED : February 11, 1986
INVENTOR(S) : WALTER R. BURHANS, JR.

It is certified that error appears in the above-identified patent and that said Letters Patent are hereby corrected as shown below:

Col. 6, line 25, change "sorwardly" to -- forwardly --

Col. 7, line 1, change "consits" to -- consist --
line 29, change "behine" to -- behind --

Signed and Sealed this

Sixteenth Day of December, 1986

Attest:

DONALD J. QUIGG

*Attesting Officer*  *Commissioner of Patents and Trademarks*